(12) United States Patent
Preisler et al.

(10) Patent No.: US 8,622,456 B2
(45) Date of Patent: Jan. 7, 2014

(54) CARPETED, AUTOMOTIVE VEHICLE, LOAD FLOOR INCLUDING A PIVOTABLE COVER HAVING A DECORATIVE, BACKSIDE, NOISE-MANAGEMENT, COVERING

(75) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 13/523,209

(22) Filed: Jun. 14, 2012

(65) Prior Publication Data

US 2013/0278008 A1     Oct. 24, 2013

Related U.S. Application Data

(63) Continuation-in-part of application No. 13/453,201, filed on Apr. 23, 2012.

(51) Int. Cl.
*B60N 3/12*     (2006.01)

(52) U.S. Cl.
USPC .................................. 296/39.3; 296/193.07

(58) Field of Classification Search
USPC ............ 296/97.23, 37.1, 37.8, 193.07, 182.1, 296/184.1, 37.08, 37.14, 37.15, 37.16, 37.5, 296/39.3; 428/95, 423.1; 16/72, 277
See application file for complete search history.

(56) References Cited

U.S. PATENT DOCUMENTS

| | | |
|---|---|---|
| 5,298,694 A | 3/1994 | Thompson et al. |
| 5,502,930 A | 4/1996 | Burkette et al. |
| 5,915,445 A | 6/1999 | Rauenbusch |
| 5,979,962 A | 11/1999 | Balentin et al. |
| 6,050,630 A | 4/2000 | Hochet |
| 6,102,464 A | 8/2000 | Schneider et al. |
| 6,102,630 A | 8/2000 | Schneider et al. |
| 6,435,577 B1 | 8/2002 | Renault |
| 6,537,413 B1 | 3/2003 | Hochet et al. |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Allison et al. |
| 6,682,676 B1 | 1/2004 | Renault et al. |
| 6,720,058 B1 * | 4/2004 | Weeks et al. ................... 428/94 |
| 6,748,876 B2 | 6/2004 | Preisler et al. |
| 6,790,026 B2 | 9/2004 | Vandangeot et al. |
| 6,793,747 B2 | 9/2004 | North et al. |
| 6,823,803 B2 | 11/2004 | Preisler |
| 6,843,525 B2 | 1/2005 | Preisler |
| 6,890,023 B2 | 5/2005 | Preisler et al. |
| 6,911,248 B2 * | 6/2005 | Sabatini ....................... 428/119 |

(Continued)

*Primary Examiner* — Glenn Dayoan
*Assistant Examiner* — Pinel Romain
(74) *Attorney, Agent, or Firm* — Brooks Kushman P.C.

(57) ABSTRACT

A carpeted, automotive vehicle, load floor including a compression-molded composite panel is provided. A cover of the load floor covers a storage area of the vehicle and is pivotally connected to the composite panel. A substantially continuous carpet layer is bonded to the top surface of the panel and the top surface of the cover to at least partially form the carpeted load floor having a carpeted cover. A living hinge allows the carpeted cover to pivot between different use positions including open and closed positions. A decorative, noise-management covering layer is bonded to the bottom surface of the cover to reduce the level of undesirable noise in a passenger compartment of the vehicle in the closed position and to provide an aesthetically pleasing appearance to the bottom of the cover in the open position.

20 Claims, 3 Drawing Sheets

(56) References Cited

U.S. PATENT DOCUMENTS

| | | | |
|---|---|---|---|
| 6,918,625 B2 | 7/2005 | Storto et al. | |
| 6,926,348 B2 * | 8/2005 | Krueger et al. | 296/184.1 |
| 6,945,594 B1 * | 9/2005 | Bejin et al. | 296/193.07 |
| 6,981,863 B2 | 1/2006 | Renault et al. | |
| 7,014,259 B2 | 3/2006 | Heholt | |
| 7,059,646 B1 | 6/2006 | DeLong et al. | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,328,480 B2 * | 2/2008 | Schoemann | 16/225 |
| 7,399,515 B1 * | 7/2008 | Thele | 428/95 |
| 7,402,537 B1 | 7/2008 | Lenda et al. | |
| 7,419,713 B2 | 9/2008 | Wilkens et al. | |
| 7,628,440 B2 * | 12/2009 | Bernhardsson et al. | 296/37.14 |
| 7,754,120 B2 * | 7/2010 | Kessing | 264/113 |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 2003/0097808 A1 * | 5/2003 | Sabatini | 52/384 |
| 2004/0037995 A1 * | 2/2004 | Nicolai et al. | 428/95 |
| 2004/0096628 A1 * | 5/2004 | Saathoff et al. | 428/174 |
| 2005/0189674 A1 | 9/2005 | Hochet et al. | |
| 2006/0255611 A1 | 11/2006 | Smith et al. | |
| 2008/0145635 A1 | 6/2008 | Stoll et al. | |
| 2008/0185866 A1 | 8/2008 | Jeong et al. | |
| 2010/0026031 A1 * | 2/2010 | Jouraku | 296/37.16 |
| 2010/0060038 A1 * | 3/2010 | Takakura et al. | 296/193.07 |
| 2011/0315310 A1 | 12/2011 | Trevisan et al. | |

\* cited by examiner

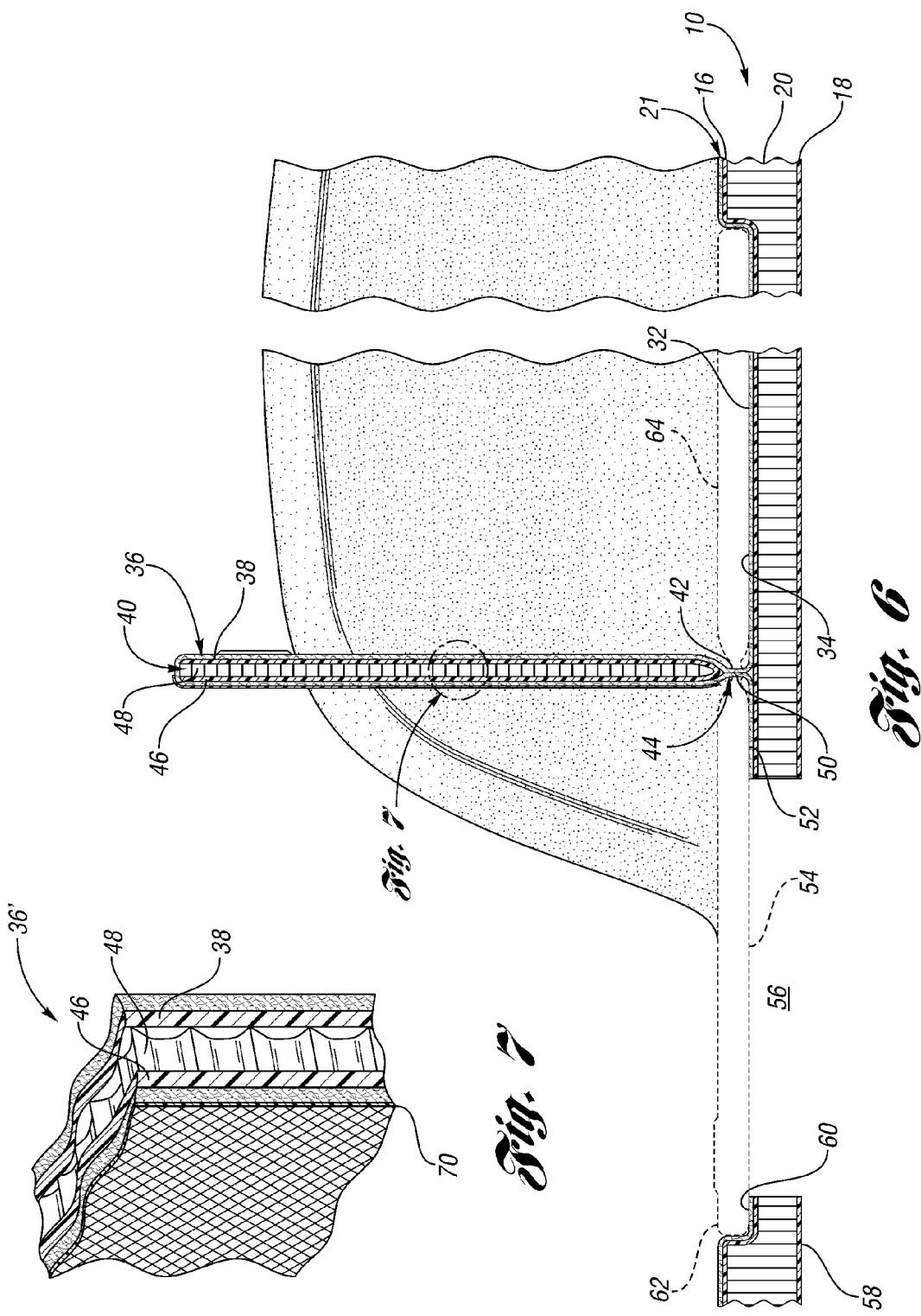

CARPETED, AUTOMOTIVE VEHICLE, LOAD FLOOR INCLUDING A PIVOTABLE COVER HAVING A DECORATIVE, BACKSIDE, NOISE-MANAGEMENT, COVERING

CROSS-REFERENCE TO RELATED APPLICATIONS

This application is a continuation-in-part of U.S. patent application entitled "Carpeted Automotive Vehicle Load Floor Having a Living Hinge" filed Apr. 23, 2012 and having U.S. Ser. No. 13/453,201.

TECHNICAL FIELD

This invention relates, in general, to the field of automotive vehicle load floors and, in particular, to such load floors which are carpeted and have a pivotable cover.

OVERVIEW

Sandwich-type composite panels having cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and the manufacturing cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,843,525; 6,890,023; 6,981,863; 7,014,259; 7,090,274; 7,093,879; 7,264,685; 7,320,739; 7,402,537; 7,419,713; 7,837,009; 7,909,379; 7,918,313; 7,919,031; 8,117,972; 2006/0255611; 2008/0185866 and 2011/0315310.

One problem associated with prior art load floors is that the load floors typically require many assembly stops often involving costly labor. Also, the material making up such load floors is often non-recyclable.

A problem associated with carpeted load floors having covers which cover a storage area in an automotive vehicle is that loose items or objects in the storage area can cause relatively loud, undesirable noises during vehicle travel. Also, when the cover is in its open position the underside of the cover is not particularly visually appealing.

SUMMARY OF EXAMPLE EMBODIMENTS

An object of at least one embodiment of the present invention is to provide a carpeted automotive vehicle load floor including at least one light-weight and strong sandwich-type composite panel, a cover to cover a storage area in the vehicle and a living hinge between the panel and the cover wherein a decorative, noise-management covering layer is bonded to a lower surface of the cover to provide sound insulation in a closed position of the cover and an aesthetically pleasing appearance to the bottom of the cover in an open position of the cover.

In carrying out the above object and other objects of at least one embodiment of the invention, a carpeted automotive vehicle load floor is provided. The load floor includes a composite panel having first and second outer layers, and a core having a large number of cavities and disposed between and bonded to the layers by press molding. The first layer having a top surface. The load floor also includes a cover to cover a storage area of the vehicle and having top and bottom surfaces. The cover is pivotably connected to the composite panel. The load floor further includes a substantially continuous top carpet layer bonded to the top surface of the panel and the top surface of the cover to at least partially form a carpeted load floor having a carpeted cover. A living hinge allows the carpeted cover to pivot between different use positions including open and closed positions relative to the rest of the load floor. A decorative, noise-management, covering layer is bonded in the bottom surface of the cover to reduce the level of undesirable noise in a passenger compartment of the vehicle in the closed position and to provide an aesthetically pleasing appearance to the bottom of the cover in the open position.

The covering layer may include an acoustical scrim layer.

A portion of the covering layer not bonded to the cover may at least partially form the living hinge.

The living hinge may be a two-way living hinge.

The covering layer may be a nonwoven scrim of fine denier thermoplastic fibers in the form of a sheet. The fibers may be spunbond.

A portion of the composite panel may have a reduced thickness to form a depression which receives the carpeted cover in at least one of the use positions. The thickness of carpeted panel may be substantially equal to depth of the depression. The cover-receiving depression may receive the carpeted cover in two use positions. The cover may extend from the living hinge in opposite directions in the two use positions.

The cover may be a thermoplastic cover, such layer may be a thermoplastic scrim layer and the thermoplastic of the cover and the scrim layer may be polypropylene.

The composite panel may have a thickness in the range of 5 to 25 mm.

The scrim layer may be a thermoplastic acoustical scrim layer having thermoplastic fibers which are spunbond.

The cover may include a second compression-molded composite panel including third and fourth cover layers and a second core disposed between and bonded to the third and fourth outer layers. The third and fourth outer layers may be bonded to the second core by press molding.

Further in carrying out the above object and other objects of at least one embodiment of the present invention, a carpeted, automotive vehicle, load floor is provided. The load floor includes a compression-molded composite panel having first and second reinforced thermoplastic skins and a core having a large number of cavities positioned between and bonded to the skins by press molding. The first skin has a top surface. The load floor also includes a cover to cover a storage area of the vehicle and pivotally connected to the panel. The load floor further includes a substantially continuous carpet layer bonded to the top surface of the panel and a top surface of the cover to form a carpeted load floor having a carpeted cover. A living hinge allows the carpeted cover to pivot between different use positions including open and closed positions relative to the rest of the load floor. A decorative, noise-management, covering layer is bonded to the bottom surface of the cover to reduce the level of undesirable noise in a passenger compartment of the vehicle in the closed position and to provide an aesthetically pleasing appearance to the bottom of the cover in the open position.

The covering layer may be an acoustical thermoplastic covering layer.

A portion of the covering layer not bonded to the cover may at least partially form the living hinge.

Still further in carrying out the above object and other objects of the present invention, a carpeted, automotive vehicle, load floor is provided. The load floor includes a compression-molded composite panel having first and second reinforced thermoplastic skins and a core having a large number of cavities and disposed between and bonded to the skins. The first skin has a top surface. The load floor also includes a cover to cover a storage area of the vehicle and having top and bottom surfaces. The cover is pivotally connected to the panel. The cover includes third and fourth reinforced thermoplastic skins and a core having a large number of cavities and disposed between and bonded to the third and fourth skins by press molding. The load floor further includes a substantially continuous carpet layer bonded to the top surface of the panel and the top surface of the cover to form a carpeted load floor having a carpeted cover. A living hinge allows the carpeted cover to pivot between different use positions including open and closed positions relative to the rest of the load floor. A decorative, noise-management, covering layer is bonded to the bottom surface of the cover to reduce the level of undesirable noise in a passenger compartment of the vehicle in the closed position and to provide an aesthetically appealing appearance to the bottom of the cover in the open position.

The covering layer may include an acoustical scrim layer.

A portion of the covering layer not bonded to the cover may at least partially form the living hinge.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 6 is a side view, partially broken away and in cross section, of one of the panels of FIG. 5 with its carpeted cover shown in three different use positions, two of which are shown by phantom lines; and FIG. 7 is a perspective view, partially broken away and in cross section, showing a different decorative, noise management lower covering layer for the carpeted cover.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
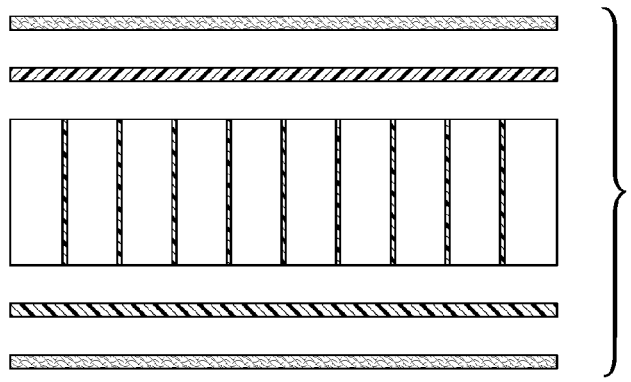
FIG. 1 is a side sectional view showing various separate layers of a prior art stack of thermoplastic-based layers of material.
Figure 2:
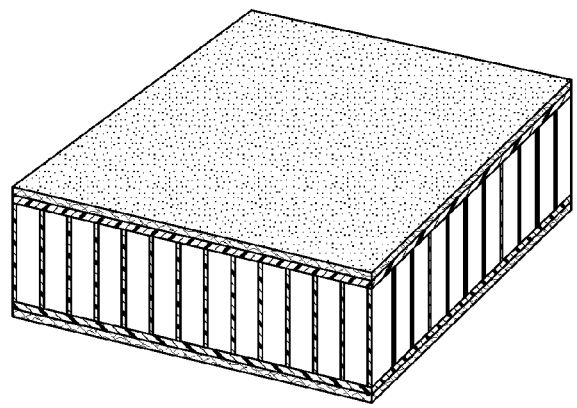
FIG. 2 is a top perspective sectional view of the stack of FIG. 1 after compression molding.
Figure 3:
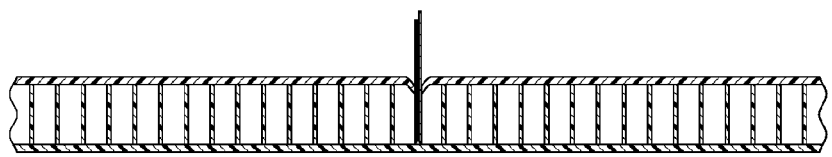
FIGS. 3 and 4 are side views, partially broken away and in cross section, of a prior art sandwich-type composite panel having a living hinge and method of making the living hinge.
Figure 4:
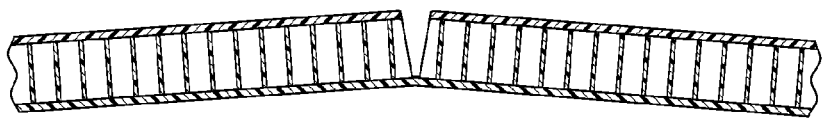
Figure 5:
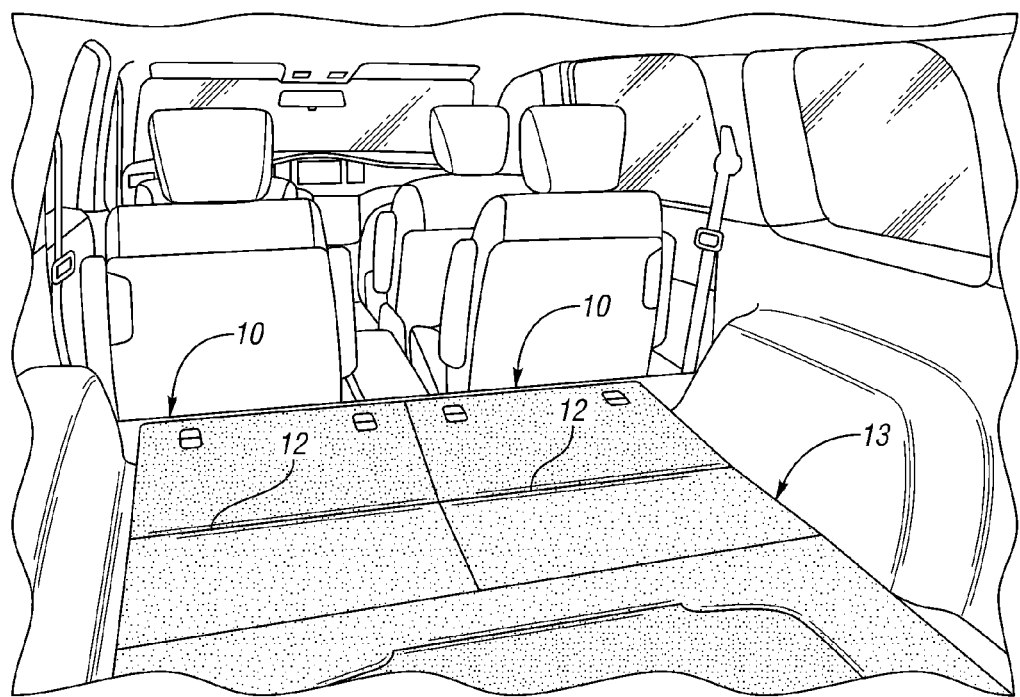
FIG. 5 is an environmental view, partially broken away, of a carpeted automotive vehicle load floor including a pair of carpeted, sandwich-type, compression-molded composite panels each having a pivotable carpeted cover with a decorative, noise-management lower covering layer constructed in accordance with at least one embodiment of the present invention.

Referring now to the FIGS. 5 and 6, one embodiment of a carpeted automotive vehicle load floor, generally indicated at 13, includes a pair of carpeted, compression-molded, sandwich-type composite hinged panels 10. Each panel 10 has a living hinge 12 and forms a separate part of the vehicle load floor 13. However, it is to be understood that one or more hinged panels 10 constructed in accordance with at least one embodiment of the present invention may be used in a wide variety of environments besides the automotive vehicle environment of FIG. 5.

Each hinged panel 10 is typically manufactured by providing a stack of material located or positioned within a mold. The stack includes first and second reinforced thermoplastic skins or outer layers 16 and 18, respectively, a core having a large number of cavities such as a thermoplastic cellular core 20 disposed between and bonded to the skins 16 and 18 by press molding. A substantially continuous covering or carpet layer, generally indicated at 21, made of thermoplastics material covers the first skin 16. The skins 16 and 18 are heated typically outside of the mold to a softening temperature. The mold is preferably a low-pressure, compression mold which performs a thermo-compression process on the stack of materials.

A portion 32 of the composite panel 10 is crushed at a predetermined location simultaneously with the step of applying the pressure to compact and reduce the thickness of the cellular core 20 at the predetermined location for form a depression 34 which receives a carpeted cover, generally indicated at 36, of the hinged panel 10 at a pair of use positions as indicated by phantom lines in FIG. 6. The thickness of the carpeted cover 36 is substantially equal to the depth of the depression 34.

The thermoplastic carpet layer 21 not only covers the first skin 18, but also covers and is bonded to a skin 38 of a panel, generally indicated at 40, of the cover 36. An intermediate portion 42 of the layer 21 is not bonded to either the skin 16 or the skin 38 to form a living hinge, generally indicated at 44 (or 12 in FIG. 5). The living hinge 44 allows the carpeted cover 36 to pivot between the different use positions of FIG. 6.

The carpet layer 21 may be a resin carpet and the resin may be polypropylene. One side or both sides of the cover 36 of the hinged panel 10 may be covered with the carpet layer 21 which may be made of a woven or nonwoven material (typically of the carpet type).

As shown in FIG. 6, the panel 40 also includes a skin 46 and a cellular core 48 disposed between and bonded to the skins 38 and 46. A bottom layer of the covering layer 21 extends from the top layer of the layer 21 and is bonded to and covers the top surface of the skin 46 to cover the bottom surface of the cover 36. The bottom layer of the cover 21 is a decorative, noise-management, covering layer bonded to the bottom surface of the cover 36 to provide sound insulation in the closed position of the cover 36 and an aesthetically pleasing appearance to the bottom of the cover 26 in its open position. In other words, the covering layer reduces the level of undesirable noise in a passenger compartment of the vehicle in the closed position of the cover 36. A portion 50 of the covering layer not bonded to the cover 36 is bonded to the intermediate portion 42 of the top layer of the covering 21 to further form the living hinge 44.

The cellular core 48 (as well as the core 20) may be a honeycomb core. In this example, the cellular core 48 and the core 20 have an open-celled structure of the type made up of tubes or a honeycomb, and it is made mainly of polyolefin and preferably of polypropylene. It is also possible to use a cellular structure having closed cells of the foam type. Alternatively, the panel 40 may be made of a solid material, such as a solid plastic part, to which the top and bottom layers of the layer 21 are bonded.

Each of the skins 16 and 18 (as well as the skins 38 and 46) may be fiber reinforced. The thermoplastic of the skins 16, 18, 38 and 46, the covering layer 21 and the cores 20 and 48 may be polypropylene. At least one of the skins 16, 18, 38 and 46 may be woven skin, such as polypropylene skin. Each of the skins 16, 18, 38 and 46 may be reinforced with fibers, e.g., glass fibers, carbon fibers or natural fibers. At least one of the skins 16, 18, 38 and 46 may advantageously be made up of woven glass fiber fabric and of a thermoplastics material.

The resulting hinged panel 10 may have a thickness in the range of 5 to 25 mm and the crushed portion of the panel 10 may have a thickness in the range of 3 to 15 mm. The depression 34 may have a depth in the range of 2 to 10 mm.

In one example method of making the hinged panel 10 including the panel 40, stacks of material may be pressed in a low pressure cold-forming mold 22. With respect to a part of the hinged panel 10, the stack is made up of the first skin 16, the cellular core 20, the second skin 18 and a portion of the covering layer 21, and is pressed at a pressure lying in the range of $10 \times 10^5$ Pa. to $30 \times 10^5$ Pa. The first and second skins 16 and 18 are preferably pre-heated to make them malleable and stretchable. Advantageously, in order to soften the first and second skins 16 and 18, respectively, heat is applied to a pre-assembly constituted by the stack made up of at least the first skin 16, of the cellular core 20, and the second skin 18 so that, while a part of the panel 10 is being formed in the mold, the first and second skins 16 and 18 have a forming temperature lying approximately in the range of 160° C. to 200° C., and, in this example, about 180° C. In like fashion, the cover 36 may be formed.

An end portion 52 of the bottom layer of the layer 21 is also bonded to the top surface of the skin 16 and helps to support the carpeted cover 36 in one of the use positions of the cover 36, as indicated in phantom at 54 in FIG. 6. In the position 54, the cover 36 encloses a storage area 56 between the panel 10 and another composite panel 58 having a depression 60 to receive a free end portion 62 of the cover 36. The panel 58 may also be a carpeted composite panel similar in construction to the hinged panel 10 having the cover 36.

In another use position, indicated at 64 by phantom lines, the cover 36 is completely received within the depression 34 to allow access to the storage area 56 without having to hold the cover 36 open as indicated by the solid line position of the cover 36 in FIG. 6

The covering layer 21 including its top and bottom layers is substantially continuous and may be formed from separate pieces of thermoplastic resin carpet which are subsequently bonded or fused together, such as by heat and/or pressure to carpet the entire top surface of the hinged panel 10 as well as the bottom surface of the cover 36.

Referring now to FIG. 7, a second embodiment of a carpeted, sandwich-type, composite hinged panel is shown. The panels have substantially the same structure and function as the panels 10 of the first embodiment except instead of a bottom layer of thermoplastic resin carpet, the bottom layer of the cover 36' is made of a nonwoven scrim 70 of fine denier, spunbond thermoplastic (i.e., polypropylene and/or polyester) fibers in the form of a sheet and having a weight in a range of 8 to 100 gsm (i.e., grams per square meter). Preferably, the weight is in a range of 17 to 60 gms. Also, preferably, the denier is in a range of 1.8 to 2.2.

The scrim 70 has an open mesh of nonwoven synthetic thermoplastic fibers including a plurality of adjacent openings. The scrim 70 both transmits light to the underlying layer and reflects light while reducing the level of undesirable noise from a storage area to a passenger compartment of the vehicle. The scrim 70 may be manufactured in a color which is substantially the same, complements or is in contrast with the color of the upper carpet. Also, the cover 36' including the underlying scrim layer 70 can be made in a single compression molding step as in the first embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A carpeted, automotive vehicle, load floor comprising:
a compression-molded composite panel including first and second outer layers and a core positioned between the outer layers and having a large number of cavities wherein the outer layers are bonded to the core by press molding, the first outer layer having a top surface;
a cover to cover a storage area in the vehicle, the cover having top and bottom surfaces and being pivotably connected to the composite panel;
a substantially continuous carpet layer bonded to the top surface of the panel and the top surface of the cover to at least partially form a carpeted load floor having a carpeted cover;
a living hinge which allows the carpeted cover to pivot between different use positions including open and closed positions relative to the rest of the load floor; and
a decorative, noise-management, covering layer bonded to the bottom surface of the cover to reduce the level of undesirable noise in a passenger compartment of the vehicle in a closed position and to provide an aesthetically pleasing appearance to the bottom of the cover in the open position.

2. The load floor as claimed in claim 1, wherein the covering layer includes an acoustical scrim layer.

3. The load floor as claimed in claim 1, wherein a portion of the covering layer not bonded to the cover at least partially forms the living hinge.

4. The load floor as claimed in claim 1, wherein the living hinge is a two-way living hinge.

5. The load floor as claimed in claim 1, wherein the covering layer is a nonwoven scrim of fine denier thermoplastic fibers in the form of a sheet.

6. The load floor as claimed in claim 5, wherein the fibers are spunbond.

7. The load floor as claimed in claim 1, wherein a portion of the composite panel has a reduced thickness to form a depression which receives the carpeted cover in at least one of the use positions and wherein thickness of the carpeted cover is substantially equal to depth of the depression.

8. A carpeted, automotive vehicle, load floor comprising:
a compression-molded composite panel including first and second outer layers and a core positioned between the outer layers and having a large number of cavities wherein the outer layers are bonded to the core by press molding, the first outer layer having a top surface;
a cover to cover a storage area in the vehicle, the cover having top and bottom surfaces and being pivotably connected to the composite panel;
a substantially continuous carpet layer bonded to the top surface of the panel and the top surface of the cover to at least partially form a carpeted load floor having a carpeted cover;
a living hinge which allows the carpeted cover to pivot between different use positions including open and closed positions relative to the rest of the load floor; and
a decorative, noise-management, covering layer bonded to the bottom surface of the cover to reduce the level of undesirable noise in a passenger compartment of the vehicle in a closed position and to provide an aesthetically pleasing appearance to the bottom of the cover in the open position; wherein a portion of the composite panel has a reduced thickness to form a depression which receives the carpeted cover in two use positions and wherein thickness of the carpeted cover is substantially equal to depth of the depression and wherein the cover extends from the living hinge in opposite directions in the two use positions.

9. The load floor as claimed in claim 2, wherein the cover is a thermoplastic cover.

10. The load floor as claimed in claim 9, wherein the scrim layer is a thermoplastic scrim layer and wherein the thermoplastic of the cover and the scrim layer is polypropylene.

11. The load floor as claimed in claim 1, wherein the composite panel has a thickness in the range of 5 to 25 mm.

12. The load floor as claimed in claim 2, wherein the scrim layer is a thermoplastic, acoustical scrim layer having thermoplastic fibers.

13. The load floor as claimed in claim 12, wherein the fibers are spunbond.

14. The load floor as claimed in claim 1, wherein the cover comprises a second compression-molded, composite panel including third and fourth outer layers and a second core having a large number of cavities positioned between the third and fourth outer layers and wherein the third and fourth outer layers are bonded to the second core by press molding.

15. A carpeted, automotive vehicle, load floor comprising:
a compression-molded, composite panel having first and second reinforced thermoplastic skins and a core having a large number of cavities disposed between the skins, the skins being bonded to the core by press molding, the first skin having a top surface;
a cover to cover a storage area of the vehicle, the cover having top and bottom surfaces and being pivotably connected to the composite panel;
a substantially continuous carpet layer bonded to the top surface of the panel and the top surface of the cover to at least partially form a carpeted load floor having a carpeted cover;
a living hinge which allows the carpeted cover to pivot between different use positions including open and closed positions relative to the rest of the load floor; and
a decorative, noise-management, covering layer bonded to the bottom surface of the cover to reduce the level of undesirable noise in a passenger compartment of the vehicle in the closed position and to provide an aesthetically pleasing appearance to the bottom of the cover in the open position.

16. The load floor as claimed in claim 15, wherein the covering layer is an acoustical thermoplastic covering layer.

17. The load floor as claimed in claim 15, wherein a portion of the covering layer not bonded to the cover at least partially forms the living hinge.

18. A carpeted, automotive vehicle, load floor comprising:
a compression-molded, composite panel having first and second reinforced thermoplastic skins and a core having a large number of cavities and disposed between and bonded to the skins by press molding, the first skin having a top surface;
a cover to cover a storage area in the vehicle, the cover having top and bottom surfaces and being pivotally connected to the composite panel, the cover comprising third and fourth reinforced thermoplastic skins and a core having a large number of cavities and disposed between and bonded to the third and fourth skins by press molding; and
a substantially continuous carpet layer bonded to the top surface of the panel and the top surface of the cover to form a carpeted load floor having a carpeted cover;

a living hinge which allows the carpeted cover to pivot between different use positions including open and closed positions relative to the rest of the load floor; and a decorative, noise-management, covering layer bonded to the bottom surface of the cover to reduce the level of undesirable noise in a passenger compartment of the vehicle in the closed position and to provide an aesthetically pleasing appearance to the bottom of the cover in the open position.

19. The load floor as claimed in claim 18, wherein the covering layer includes an acoustical scrim layer.

20. The load floor as claimed in claim 18, wherein a portion of the covering layer not bonded to the cover at least partially forms the living hinge.

* * * * *